(12) United States Patent
Chien et al.

(10) Patent No.: US 12,540,854 B2
(45) Date of Patent: Feb. 3, 2026

(54) COLOR SENSOR AND COLOR SENSING DEVICE

(71) Applicants: LITE-ON TECHNOLOGY CORPORATION, Taipei (TW); LITE-ON SINGAPORE PTE. LTD., Singapore (SG)

(72) Inventors: I-Chen Chien, Taipei (TW); Ruitao Zheng, Singapore (SG)

(73) Assignees: LITE-ON TECHNOLOGY CORPORATION, Taipei (TW); LITE-ON SINGAPORE PTE. LTD., Singapore (SG)

( * ) Notice: Subject to any disclaimer, the term of this patent is extended or adjusted under 35 U.S.C. 154(b) by 238 days.

(21) Appl. No.: 18/118,552

(22) Filed: Mar. 7, 2023

(65) Prior Publication Data

US 2023/0288259 A1    Sep. 14, 2023

(30) Foreign Application Priority Data

Mar. 10, 2022  (CN) .......................... 202210231258.7

(51) Int. Cl.
  *G01J 3/46* (2006.01)
  *G01J 3/51* (2006.01)
(52) U.S. Cl.
  CPC ................. *G01J 3/465* (2013.01); *G01J 3/51* (2013.01); *G01J 3/513* (2013.01)

(58) Field of Classification Search
  CPC ............... G01J 3/465; G01J 3/51; G01J 3/513
  See application file for complete search history.

(56) References Cited

U.S. PATENT DOCUMENTS

| | | | |
|---|---|---|---|
| 2005/0205765 A1* | 9/2005 | Tan .......................... | G01J 3/51 250/226 |
| 2008/0179497 A1* | 7/2008 | Maniam .................... | G01J 1/18 250/214 AL |
| 2009/0141042 A1* | 6/2009 | Shannon .................. | G01J 3/506 345/600 |
| 2010/0208266 A1* | 8/2010 | Shannon .................. | G01J 3/513 356/405 |
| 2020/0132549 A1* | 4/2020 | Hromin .................... | G01J 3/513 |
| 2021/0389181 A1* | 12/2021 | Siess ......................... | G01J 3/36 |
| 2021/0396589 A1* | 12/2021 | Guo ......................... | G01J 1/4204 |

* cited by examiner

*Primary Examiner* — Tarifur R Chowdhury
*Assistant Examiner* — Kemaya Nguyen
(74) *Attorney, Agent, or Firm* — Innovation Counsel LLP

(57) ABSTRACT

A color sensing device including a color sensor and a processing unit is provided. The color sensor is provided with at least three photosensitive areas and used for generating at least three photosensitive signals. The processing unit is connected to the color sensor and used for processing the at least three photosensitive signals to correspondingly generate at least three color signal tuples CIE(X,Y,Z). Two of the at least three color signal tuples CIE(X,Y,Z) share one of the photosensitive signals.

6 Claims, 7 Drawing Sheets

COLOR SENSOR AND COLOR SENSING DEVICE

This application claims the benefit of People's Republic of China application Serial No. 202210231258.7, filed Mar. 10, 2022, the subject matter of which is incorporated herein by reference.

BACKGROUND OF THE INVENTION

Field of the Invention

The invention relates in general to a light sensor, and more particularly to a color sensor and a color sensing device.

Description of the Related Art

Refer to FIG. 1 and FIG. 2. In FIG. 1, three colors stimulus values are represented with X, Y and Z using a color overlay model; the three stimulus values are exported parameters of red, green, and blue colors and are used for defining human eyes' feeling with respect the different wavelengths of a visible light. In 1931, International Commission on Illumination (CIE) conducted a color matching experiment using color stimulus values of the three primary colors (red light, green light, and blue light) and obtained a color space using RGB as unit vectors; meanwhile, a CIE 1931 XYZ color space using three color stimulus values as chromaticity coordinates was constructed as indicated in FIG. 2.

Thus, through the calculation on the CIE color space, after the three color stimulus values of human eyes with respect to a reflective object are converted to color coordinates on the CIE color space, so that the color of the reflective object (or the color temperature) can be obtained. Normally, the color sensor (or the color temperature sensor) includes three channels X, Y and Z respectively used for detecting the spectral function of the light projected to different photosensitive areas. The filter coating of the channel X is used for defining the channel X1 (the wavelength is about 442 nm). As for the color stimulus values of two wavebands in the channel X2 (the wavelength is about 599 nm), since the light is projected on the coating of the same photosensitive area, the formula of optical coating needs to be accurately adjusted. In the coating process, the wavelength, the bandwidth and the response rate of crests of two wavebands are difficult to control. Thus, the interpretation accuracy of conventional color sensor regarding the color temperature of an object has an error of ±25%, which needs to be resolved.

SUMMARY OF THE INVENTION

The invention is directed to a color sensor used for simplifying the formula of optical coating, the difficulty of manufacturing process and the color temperature correction process of the sensor, and completing the color coordinates on the CIE color space and the interpretation of color temperature to increase the interpretation accuracy of the color sensor.

According to one embodiment of the present invention, a color sensing device is provided. The color sensing device includes a color sensor and a processing unit. The color sensor is provided with at least three photosensitive areas and used for generating at least three photosensitive signals. The processing unit is connected to the color sensor and used for processing the at least three photosensitive signals to correspondingly generate at least three color signal tuples CIE(X,Y,Z). Two of the color signal tuples CIE(X,Y,Z) share one photosensitive signal.

According to another embodiment of the present invention, a color sensor is provided. The color sensor is used for converting a spectral function into color coordinates on the CIE color space. The color sensor includes a semiconductor chip and three filters. The semiconductor chip is provided with several photosensitive areas. The three filters are correspondingly disposed on three of the photosensitive areas and used for defining three spectral functions of three stimulus values on the CIE color space, wherein the spectral functions of stimulus values X1 and Z on the CIE color space share one of the filters.

According to an alternate embodiment of the present invention, a color sensing device is provided. The color sensing device includes a color sensor, a processing unit, a control unit and an interface. The color sensor is implemented on a chip and used for generating three photosensitive signals, which indicate the color of each incident light of the color sensor. The processing unit is implemented on the chip, connected to the color sensor, and used for processing three photosensitive signals to generate four channel signals. The control unit is connected to the processing unit and used for receiving and processing four channel signals to generate three sets of color signal tuples CIE(X,Y,Z). The interface is connected to the processing unit, and includes an interface terminal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the structure and operation principles of the present invention are disclosed below with accompanying drawings.

First Embodiment

Figure 1:
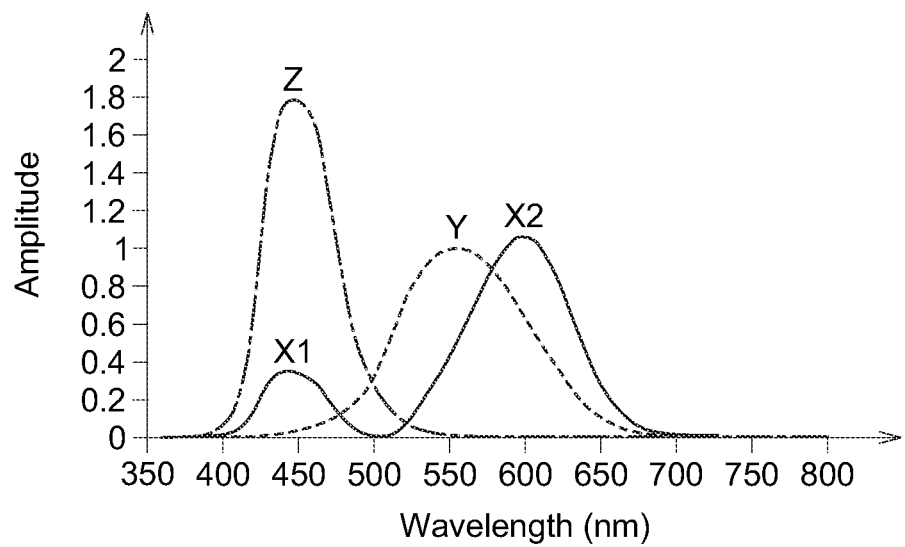
FIG. 1 (Prior Art) is a schematic diagram of three color stimulus values in the CIE XYZ color space.
Figure 2:
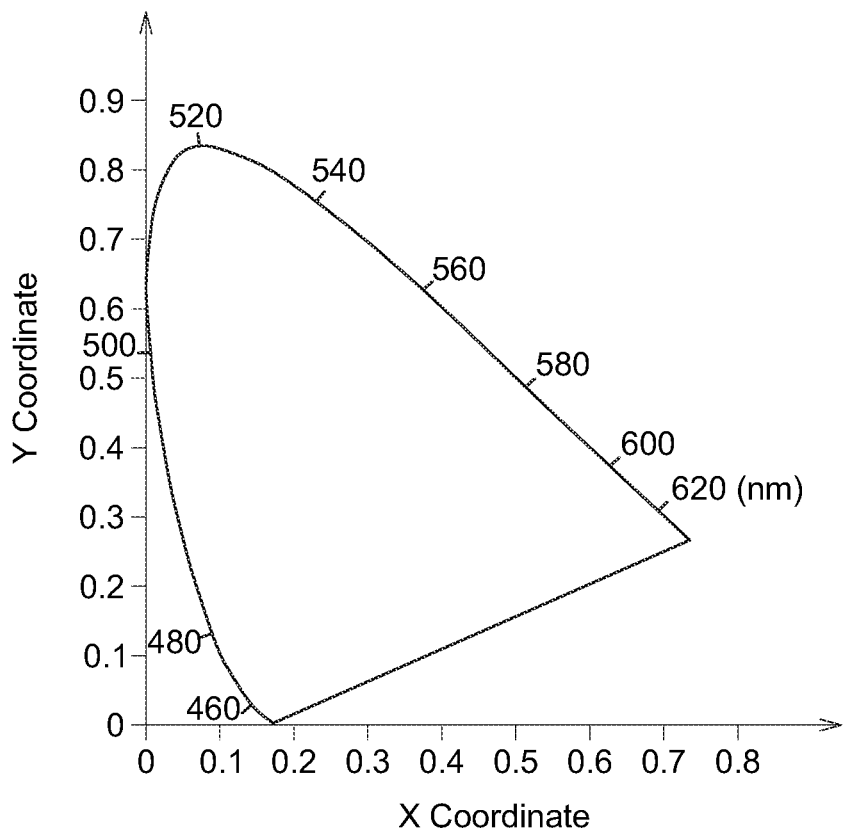
FIG. 2 (Prior Art) is a chromaticity diagram of the CIE 1931 XYZ color space.
Figure 3:
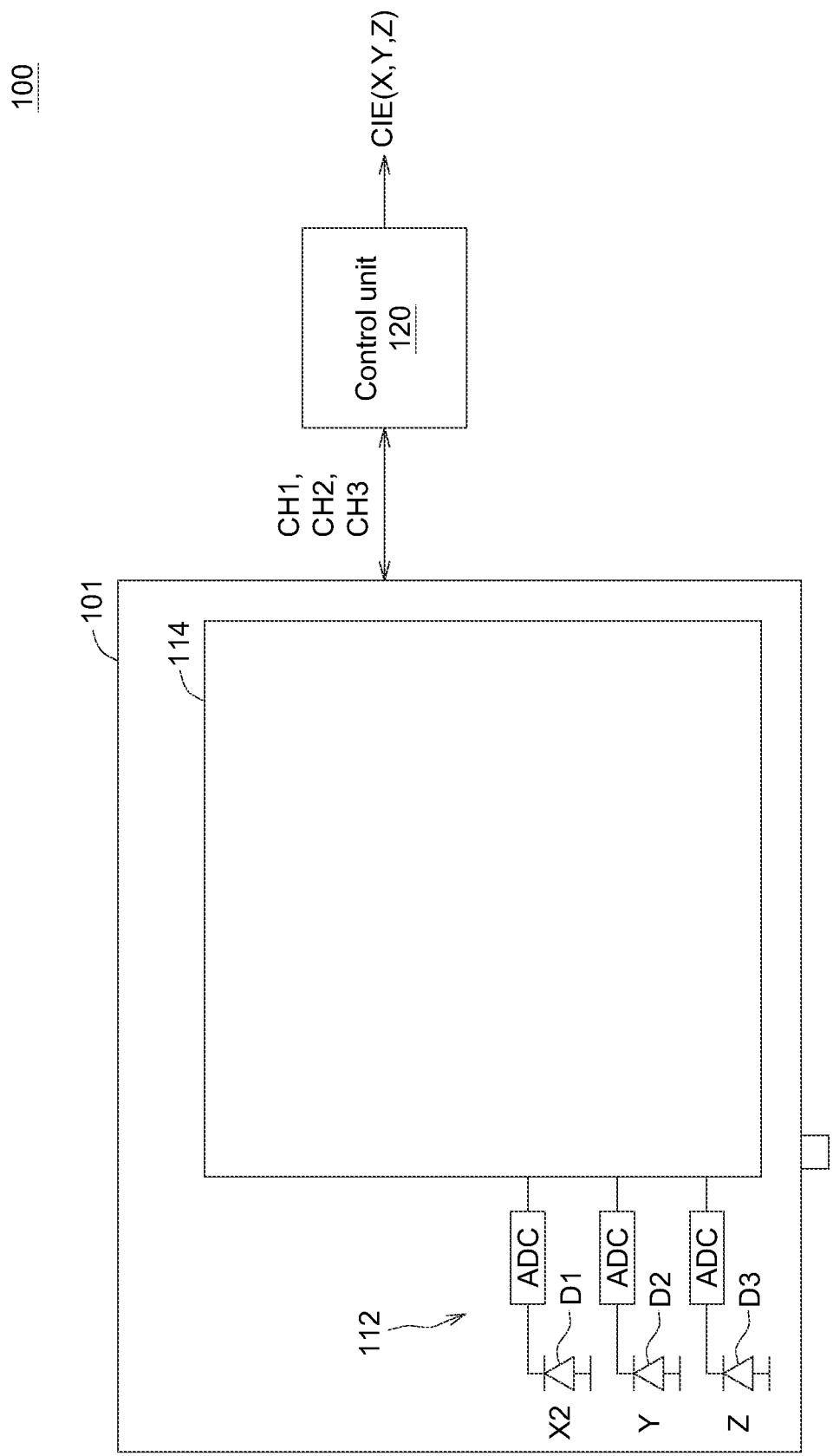
FIG. 3 is a schematic diagram of a color sensing device according to an embodiment of the present invention.

FIG. 3 is a schematic diagram of a color sensing device 100 according to an embodiment of the present invention. The color sensing device 100 includes a color sensor 101 and a processing unit 114. The color sensor 101 is provided with at least three photosensitive areas 112 and used for generating at least three photosensitive signals. The processing unit 114 is connected to the color sensor 101 and used for processing the at least three photosensitive signals to correspondingly generate at least three color signal tuples CIE(X,Y,Z), wherein two of the color signal tuples CIE(X, Y,Z) share one photosensitive signal. Furthermore, the color sensing device 100 further includes a control unit 120 connected to the processing unit 114. The processing unit 114 processes the at least three photosensitive signals to correspondingly generate at least four channel signals. The control unit 120 processes the at least four channel signals to generate at least three color signal tuples CIE(X,Y,Z).

The color sensor 101 is implemented on a chip 110 provided with an optical element array, and is configured to generate at least three channel signals, which indicate the color of each incident light of the color sensor 101. The color sensor 101 of the present invention includes a first photodiode D1 configured to generate the first photosensitive signal, a second photodiode D2 configured to generate a second photosensitive signal, and a third photodiode D3 configured to generate a third photosensitive signal. The color sensor 101 correspondingly includes at least three analog-to-digital converters (ADC, A/D, or A-to-D) used for receiving and converting the first, the second and the third photosensitive signals respectively. Besides, the color sensor 101 is further provided with a supply terminal VDD, a ground terminal GND and an interface terminal (including serial data line SDA and serial clock line SCL). The control unit 120 is configured to process the first, the second and the third channel signals CH1-CH3 to generate the color signal tuples CIE(X,Y,Z). The first, the second and the third photodiodes D1-D3 are respectively covered by the first, the second and the third filters f1-f3 (see FIG. 4A). The first, the second and the third photodiodes D1-D3 can be covered by an infrared light blocking filter or can be separately disposed within the first, the second and the third filters f1-f3.

Figure 4A:
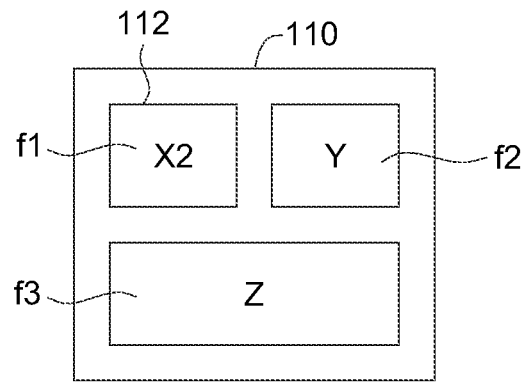
FIG. 4A and FIG. 4B are schematic diagrams of a color sensor according to an embodiment of the present invention and different spectral functions of wavelength of the light detected by the same.
Figure 4B:
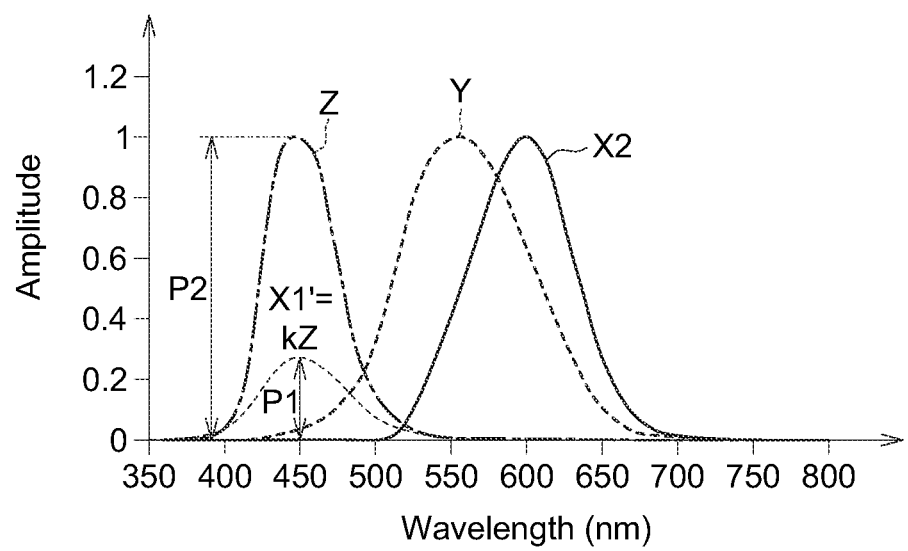

FIG. 4A and FIG. 4B are schematic diagrams of a color sensor 101 according to an embodiment of the present invention and different spectral functions of wavelength of the light detected by the same. Refer to FIG. 4A. The color sensor 101 includes a semiconductor chip 110 (such as a silicon chip or a germanium chip) and several photosensitive areas 112 (only three are illustrated in the diagram). The three photosensitive areas 112 are used for defining three spectral functions of three stimulus values X2, Y, and Z on the CIE color space. The processing unit 114 is used for generating a spectral function of stimulus value X1 on the CIE color space. The spectral function of stimulus value X1 and the spectral function of stimulus value Z share the same filter f3, so that the formula and manufacturing process of filter coating can be simplified, the production process can be shortened, and the yield rate can be increased at the same time. The sensitivity (area-under-curve) ratio of X1 and X2 could be adjustable by wafer trimming or post-processing.

As indicated in FIGS. 4A and 4B, the first photosensitive area 112 covered by the first filter f1 is used for providing a first photosensitive signal, such as the red light spectral function (the central wavelength is about 599 nm) of stimulus value X2 on the CIE color space; the second photosensitive area 112 covered by the second filter f2 is used for providing a second photosensitive signal, such as the green light spectral function (the central wavelength is about 550 nm) of stimulus value Y on the CIE color space; the third photosensitive area 112 covered by the third filter f3 is used for providing a third photosensitive signal, such as the blue light spectral function (the central wavelength is about 450 nm) of stimulus value Z on the CIE color space. Also, the blue light spectral function (the central wavelength is about 450 nm) of stimulus value Z of the third filter f3 modulates required response rate k through the processing unit 114 to generate a new spectral function $X1'=kZ$ (the central wavelength is about 450 nm) corresponding to the blue light spectral function of stimulus value X1, wherein k is close or equivalent to a ratio p1/p2 of crest height. To be more precise, k is such as a ratio of the area below the spectral function curve and is very close to the ratio of crest height; k is such as between 0.05-0.5 and preferably is between 0.1-0.2.

That is, in the present embodiment, as long as three filters f1-f3 can respectively generate the spectral functions of three stimulus values X2, Y, and Z on the CIE color space and the spectral function $X1'=kZ$ (that is, the fourth channel signal) of stimulus value X1 on the CIE color space is generated through post processing or algorithm, there is no need to form an extra filter on another photosensitive area 112. The color coordinates on the CIE color space (x,y) are expressed below:

The value of color coordinate $x$=(stimulus value $X1'$+stimulus value $X2$)/(stimulus value $X1'$+stimulus value $X2$+stimulus value $Y$+stimulus value $Z$);

The value of color coordinate $y$=stimulus value $Y$/(stimulus value $X1'$+stimulus value $X2$+stimulus value $Y$+stimulus value $Z$).

Since the three filters f1-f3 of the present embodiment are respectively formed on different photosensitive areas 112, in the coating process, the wavelength, the bandwidth and the response rate of crests of the waveband in two channels are respectively controlled; meanwhile, the control between batches is made easier. Thus, the interpretation accuracy of conventional color sensor regarding the color temperature of an object can be improved.

Second Embodiment

Figure 5A:
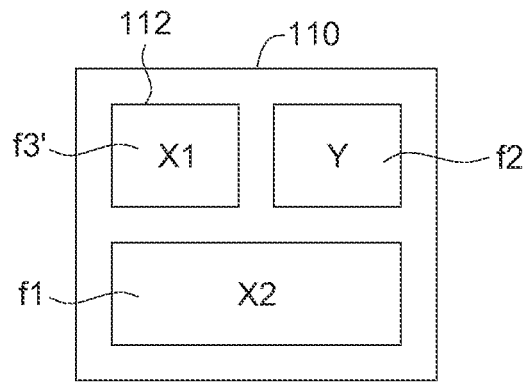
FIG. 5A and FIG. 5B are schematic diagrams of a color sensor according to an embodiment of the present invention and different spectral functions of wavelength of the light detected by the same.
Figure 5B:
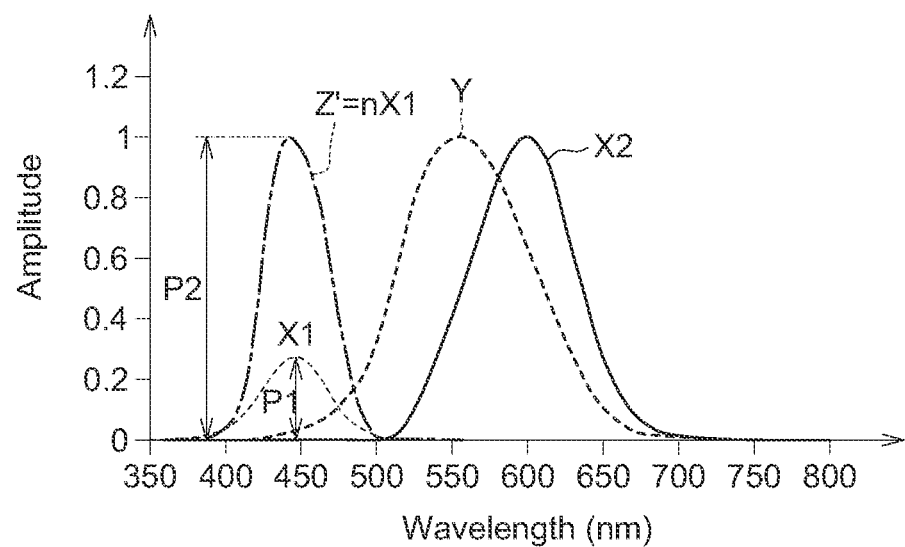

FIG. 5A and FIG. 5B are schematic diagrams of a color sensor 102 according to an embodiment of the present invention and different spectral functions of wavelength of the light detected by the same. Refer to FIG. 5A. The color sensor 102 includes a semiconductor chip 110 and several photosensitive areas 112 (only three are illustrated in the diagram). The three photosensitive areas 112 are used for defining three spectral functions of three stimulus values X1, X2, Y on the CIE color space. The processing unit 114 is used for generating a spectral function of stimulus value Z on the CIE color space. Two spectral functions corresponding to stimulus values X1 and Z share the same filter f3', so as to simplify the formula and manufacturing process of filter coating.

As indicated in FIGS. 5A and 5B, the first photosensitive area 112 covered by the first filter f1 is used for providing a first photosensitive signal, such as the red light spectral function (the central wavelength is about 599 nm) of stimulus value X2 on the CIE color space; the second photosensitive area 112 covered by the second filter f2 is used for providing a second photosensitive signal, such as the green light spectral function (the central wavelength is about 550 nm) of stimulus value Y on the CIE color space; the third photosensitive area 112 covered by a third filter f3' is used for providing a third photosensitive signal, such as the blue light spectral function (the central wavelength is about 442 nm) of stimulus value X1 on the CIE color space; Besides, the blue light spectral function (the central wavelength is about 442 nm) of stimulus value X1 of the third filter f3' modulates required response rate n through the processing unit 114 to generate a new spectral function Z'=nX1 (the central wavelength is about 442 nm) corresponding to the blue light spectral function of stimulus value Z, wherein n is close or equivalent to a ratio p2/p1 of crest height. To be more precisely, n is such as a ratio of the area below the spectral function curve and is very close to the ratio of crest height, n is such as between 4-8 and preferably is between 5-7.

That is, in the present embodiment, as long as the three filters f1, f2, and f3' respectively generate spectral functions of three stimulus values X2, Y, and X1 on the CIE color space and the spectral function Z'=nX1 (that is, the fourth channel signal) of stimulus value Z on the CIE color space is generated through post processing or algorithm, there is no need to form an extra filter on another photosensitive area 112. The color coordinates on the CIE color space (x,y) are expressed below:

The value of color coordinate $x$=(stimulus value $X1$+stimulus value $X2$)/(stimulus value $X1$+stimulus value $X2$+stimulus value $Y$+stimulus value $Z'$);

The value of color coordinate $y$=stimulus value $Y$/(stimulus value $X1$+stimulus value $X2$+stimulus value $Y$+stimulus value $Z'$).

Since the three filters f1, f2, and f3' of the present embodiment are respectively formed on different photosensitive areas 112, in the coating process, the wavelength, the bandwidth and the response rate of crests of the waveband in two channels are respectively controlled; meanwhile, the control between batches is made easier. Thus, the interpretation accuracy of conventional color sensor regarding the color temperature of an object can be improved.

Third Embodiment

Figure 6A:
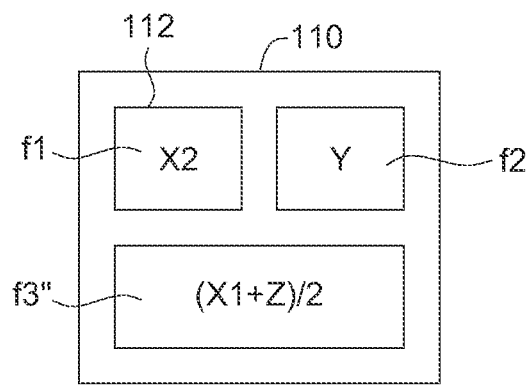
FIG. 6A and FIG. 6B are schematic diagrams of a color sensor according to an embodiment of the present invention and different spectral functions of wavelength of the light detected by the same.
Figure 6B:
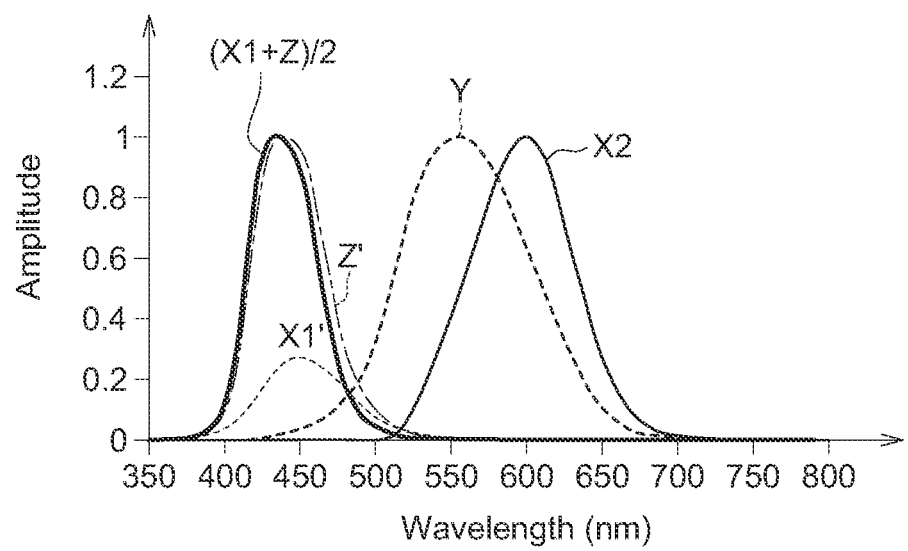

FIG. 6A and FIG. 6B are schematic diagrams of a color sensor 103 according to an embodiment of the present invention and different spectral functions of wavelength of the light detected by the same. Refer to FIG. 6A. The color sensor 103 includes a semiconductor chip 110 and several photosensitive areas 112 (only three are illustrated in the diagram). The three filters f1, f2, and f3" are correspondingly disposed on three of the photosensitive areas 112. The three photosensitive areas 112 are used for defining three spectral functions of three stimulus values (X1+Z)/2, X2, Y on the CIE color space. The spectral function of stimulus value X1 and the spectral function of stimulus value Z share the same filter f3" of the spectral function of stimulus value (X1+Z)/2, so that the formula and manufacturing process of filter coating can be simplified, the production process can be shortened, and the yield rate can be increased at the same time.

As indicated in FIGS. 6A and 6B, the first photosensitive area 112 covered by the first filter f1 is used for providing a first photosensitive signal, such as the red light spectral function (the central wavelength is about 599 nm) of stimulus value X2 on the CIE color space; the second photosensitive area 112 covered by the second filter f2 is used for providing a second photosensitive signal, such as the green light spectral function (the central wavelength is about 550 nm) of stimulus value Y on the CIE color space; the third photosensitive area 112 covered by the third filter f3" is used for providing a third photosensitive signal, such as the blue light spectral function of stimulus value (X1+Z)/2 on the CIE color space. The blue light spectral function of stimulus value (X1+Z)/2 of the third filter f3" modulates required response rates k and n through the processing unit 114 to generate two new spectral functions X1'=k(X1+Z)/2 and Z'=n(X1+Z)/2 corresponding to the blue light spectral function of stimulus value X1 and the blue light spectral function of stimulus value Z respectively.

That is, in the present embodiment, as long as the three filters f1, f2, and f3" respectively generate spectral functions of three stimulus values X2, Y, (X1+Z)/2 on the CIE color space, and the spectral functions X1'=k(X1+Z)/2 and Z'=n(X1+Z)/2 (that is, the third channel signal and the fourth channel signal) of stimulus values X1 and Z on the CIE color space can be generated through post processing or algorithm, there is no need to form an extra filter on another photosensitive area 112. The color coordinates on the CIE color space (x,y) are expressed below:

The value of color coordinate $x$=(stimulus value $X1'$+stimulus value $X2$)/(stimulus value $X1'$+stimulus value $X2$+stimulus value $Y$+stimulus value $Z'$);

The value of color coordinate $y$=stimulus value $Y$/(stimulus value $X1'$+stimulus value $X2$+stimulus value $Y$+stimulus value $Z'$).

Since the three filters f1, f2, and f3" of the present embodiment are respectively formed on different photosensitive areas 112, in the coating process, the wavelength, bandwidth and the response rate of crests of the waveband in two channels are respectively controlled; meanwhile, the control between batches is made easier. Thus, the interpretation accuracy of conventional color sensor regarding the color temperature of an object can be improved.

Figure 7:
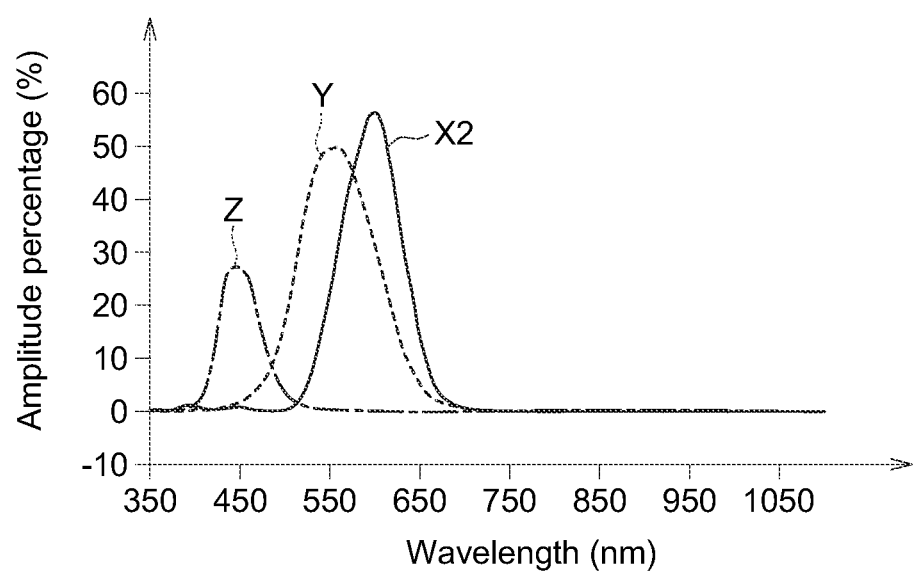
FIG. 7 is a schematic diagram of different spectral functions of wavelength forming the target light source according to an embodiment of the present invention.

Refer to FIG. 7, a schematic diagram of different spectral functions of wavelength forming the target light source according to an embodiment of the present invention is shown. The amplitude percentage T %, the crest wavelength (nm), the initial wavelength of full width at half maximum (cut-on T50%), the final wavelength of full width at half maximum (cut-off T50%) and the FWHM (Full width at half maximum) (nm) of the spectral functions of stimulus values X2, Y, and Z on the CIE color space are listed in Table 1.

TABLE 1

|  | Stimulus value Z | Stimulus value Y | Stimulus value X2 |
| --- | --- | --- | --- |
| Amplitude percentage T % | 27.3 | 50.1 | 56.5 |
| Crest wavelength (nm) | 446 | 560 | 600 |
| Initial wavelength of full width at half maximum | 424 | 510 | 557 |
| Final wavelength of full width at half maximum | 477 | 610 | 635 |
| FWHM (nm) | 53 | 100 | 78 |

Fourth Embodiment

Figure 8A:
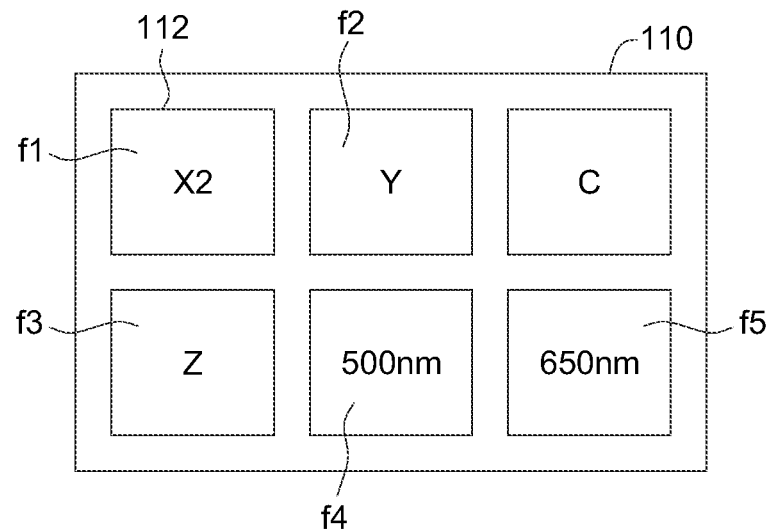
FIG. 8A and FIG. 8B are schematic diagrams of a color sensor according to an embodiment of the present invention and different spectral functions of wavelength of the light detected by the same.
Figure 8B:
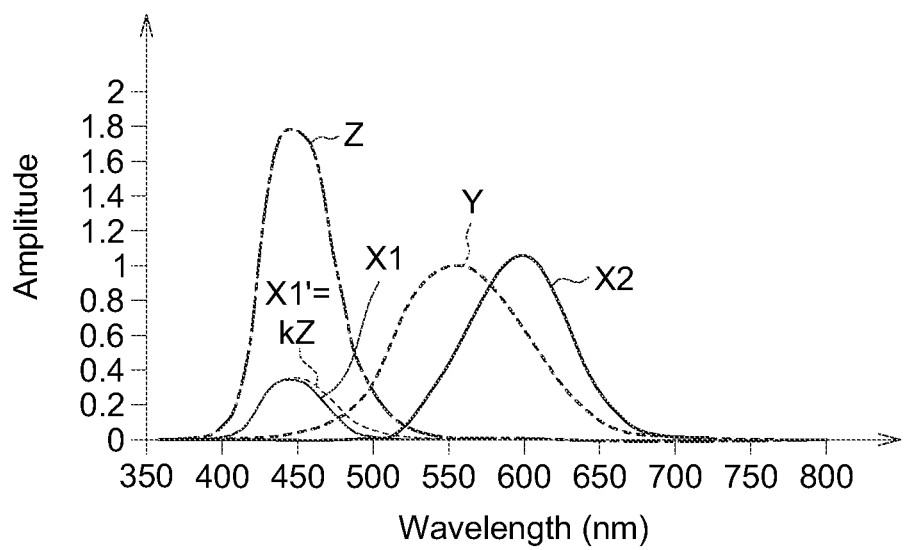

FIG. 8A and FIG. 8B are schematic diagrams of a color sensor 104b according to an embodiment of the present invention and different spectral functions of wavelength of the light detected by the same. Refer to FIG. 8A. The color sensor 104 includes a semiconductor chip 110 and several photosensitive areas 112 (six are illustrated in the diagram). Five filters f1-f5 are correspondingly disposed on five of the photosensitive areas 112, wherein three filters f1-f3 are used for generating three spectral functions of three stimulus values X2, Y, and Z on the CIE color space (or spectral functions corresponding to other stimulus values), and the remaining two filters f4-f5 are used for generating auxiliary spectral functions. The processing unit 114 is used for generating a spectral function of stimulus value X1 on the CIE color space. The spectral function of stimulus value X1 and the spectral function of stimulus value Z share the same filter f3, so that the formula and manufacturing process of filter coating can be simplified, the production process can be shortened, and the yield rate can be increased at the same time. Also, the photosensitive area C does not include filter, and therefore can be used for generating reference channel or can be used for correcting or normalizing other channel signals. The signals processed in this way can form the color signal tuples for calibration.

As indicated in FIGS. 8A and 8B, the first photosensitive area 112 covered by the first filter f1 is used for providing a first photosensitive signal, such as the red light spectral function (the central wavelength is about 599 nm) of stimulus value X2 on the CIE color space; the second photosensitive area 112 covered by the second filter f2 is used for providing a second photosensitive signal, such as the green light spectral function (the central wavelength is about 550 nm) of stimulus value Y on the CIE color space; the third photosensitive area 112 covered by the third filter f3 is used for providing a third photosensitive signal, such as the blue light spectral function (the central wavelength is about 450 nm) of stimulus value Z on the CIE color space; and the blue light spectral function (the central wavelength is about 450 nm) of stimulus value Z modulates required response rate through post processing or algorithm to generate a new spectral function X1'=kZ (the central wavelength is about 450 nm) corresponding to the blue light spectral function of stimulus value X1. Besides, the fourth photosensitive area 112 is used for providing a fourth photosensitive signal to define a spectral function whose central wavelength is 500 nm; the fifth photosensitive area 112 is used for providing a spectral function whose central wavelength is 650 nm.

That is, in the present embodiment, as long as the three filters f1-f3 respectively generate spectral functions of three stimulus values X2, Y, and Z on the CIE color space and the spectral function X1'=kZ (that is, the fourth channel signal) of stimulus value X1 on the CIE color space can be generated through post processing or algorithm, there is no need to form an extra filter on another photosensitive area 112, the formula and manufacturing process of filter coating can be simplified. Meanwhile, two auxiliary spectral functions (exemplarily but not restrictively, the central wavelengths are 500 nm and 650 nm) are added, and the interpretation accuracy of the color sensor 104 regarding the color temperature of an object can be improved.

Since three filters f1, f2, and f3 of the present embodiment are respectively formed on different photosensitive areas 112, in the coating process, the wavelength, the bandwidth and the response rate of crests of the waveband in two channels are respectively controlled; meanwhile, the control between batches is made easier. Thus, the interpretation accuracy of conventional color sensor regarding the color temperature of an object can be improved.

The color sensor according to above embodiments of the present invention simplifies the formula of optical coating and the color temperature correction process of the sensor and completes the interpretation of the color coordinates and the color temperature on the CIE color space, so to increase the interpretation accuracy of the color sensor. In the first embodiment, three photosensitive areas are used for generating three spectral functions of three stimulus values X2, Y, and Z on the CIE color space, wherein the spectral function of stimulus value X1 and the spectral function of stimulus value Z share the same filter. In the second embodiment, three photosensitive areas are used for generating three spectral functions of three stimulus values X1, X2, Y on the CIE color space, wherein the spectral function of stimulus value X1 and the spectral function of stimulus value Z share the same filter. In the third embodiment, three photosensitive areas are used for generating the spectral functions of three stimulus values (X1+Z)/2, X2, Y on the CIE color space, wherein the spectral function of stimulus value X1 and the spectral function of stimulus value Z share the same filter of the spectral function of stimulus value (X1+Z)/2. In the fourth embodiment, three photosensitive areas are used for generating three spectral functions of three stimulus values X2, Y, and Z on the CIE color space, and the remaining two photosensitive areas are used for generating auxiliary spectral functions, wherein the spectral function of stimulus value X1 and the spectral function of stimulus value Z share the same filter.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A color sensing device, comprising:
   a color sensor provided with at least three photosensitive areas and used for generating at least three photosensitive signals;
   a processing unit, being a semiconductor chip, connected to the color sensor and used for processing the at least three photosensitive signals to generate at least four channel signals; and
   a control unit connected to the processing unit, wherein the control unit processes the at least four channel signals to generate the at least three color signal tuples CIE(X,Y,Z) (International Commission on Illumination), and a number of the photosensitive signals is less than a number of the channel signals;
   wherein two of the color signal tuples CIE(X,Y,Z) share one of the at least three photosensitive signals, and a spectral function of stimulus value X1 and a spectral function of stimulus value Z on a CIE color space share a same filter disposed on the color sensor,
   wherein the spectral function of stimulus value Z is represented by the spectral function of stimulus value X1, or the spectral function of the stimulus value X1 is represented by the spectral function of stimulus value Z, or the spectral function of stimulus value Z and the spectral function of stimulus value X1 are represented by the spectral function of stimulus value (X1+Z)/2, respectively.

2. The color sensing device according to claim 1, wherein the at least three photosensitive areas are covered with corresponding filters to implement modulation of CIE spectral response.

3. The color sensing device according to claim 1, wherein the at least three photosensitive areas comprise: a first photosensitive area covered by a first filter used for providing a first photosensitive signal, corresponding to a red light spectral function of stimulus value X2 on the CIE color space; a second photosensitive area covered by a second filter used for providing a second photosensitive signal, corresponding to a green light spectral function of stimulus value Y on the CIE color space; a third photosensitive area covered by a third filter used for providing a third photosensitive signal, corresponding to a blue light spectral function of stimulus value Z on the CIE color space; and the blue light spectral function of stimulus value Z of the third filter modulates a required response rate k through the processing unit to generate a new spectral function X1'=kZ corresponding to a blue light spectral function of stimulus value X1.

4. The color sensing device according to claim 1, wherein the at least three photosensitive areas comprise: a first photosensitive area covered by a first filter used for providing a first photosensitive signal, corresponding to a red light spectral function of stimulus value X2 on the CIE color space; a second photosensitive area covered by a second filter used for providing a second photosensitive signal, corresponding to a green light spectral function of stimulus value Y on the CIE color space; a third photosensitive area covered by a third filter used for providing a third photosensitive signal, corresponding to a blue light spectral function of stimulus value X1 on the CIE color space; and the blue light spectral function of stimulus value X1 of the third filter modulates a required response rate n through the processing unit to generate a new spectral function Z'=nX1 corresponding to a blue light spectral function of stimulus value Z.

5. The color sensing device according to claim 1, wherein the at least three photosensitive areas comprise: a first photosensitive area covered by a first filter used for providing a first photosensitive signal, corresponding to a red light spectral function of stimulus value X2 on the CIE color space; a second photosensitive area covered by a second filter used for providing a second photosensitive signal, corresponding to a green light spectral function of stimulus value Y on the CIE color space; a third photosensitive area covered by a third filter used for providing a third photosensitive signal, corresponding to a blue light spectral function of stimulus value (X1+Z)/2 on the CIE color space; and the blue light spectral function of stimulus value (X1+Z)/2 of the third filter modulates required response rates k and n through the processing unit to generate two new spectral functions X1'=k(X1+Z)/2 and Z'=n(X1+Z)/2 corresponding to a blue light spectral function of stimulus value X1 and a blue light spectral function of stimulus value Z respectively.

6. The color sensing device according to claim 1, wherein the at least three photosensitive areas comprise five filters correspondingly disposed on five of the photosensitive areas, wherein three of the filters are used for generating three spectral functions of three stimulus values on the CIE color space, and the other two filters are used for generating auxiliary spectral functions.

\* \* \* \* \*